United States Patent [19]

Wolfer et al.

[11] Patent Number: 5,593,542

[45] Date of Patent: Jan. 14, 1997

[54] METHOD FOR RECOVERING FIBER FROM EFFLUENT STREAMS

[75] Inventors: Ernest P. Wolfer, Allendale; Brent Willemsen, Westfield; Venkat B. Maroju, Washington Township; Andres Martiny, Bridgewater, all of N.J.

[73] Assignee: Marcal Paper Mills, Inc., Elmwood Park, N.J.

[21] Appl. No.: 436,735

[22] Filed: May 8, 1995

[51] Int. Cl.⁶ ..................................................... D21D 5/00
[52] U.S. Cl. ................................. 162/4; 162/30.1; 162/55
[58] Field of Search ................................. 162/4, 5, 30.1, 162/55; 209/12.1, 13

[56] References Cited

U.S. PATENT DOCUMENTS

| | | |
|---|---|---|
| 3,740,363 | 6/1973 | Fuller . |
| 3,833,468 | 9/1974 | Boniface . |
| 3,849,245 | 11/1974 | Marsh et al. . |
| 4,332,638 | 6/1982 | Mauer et al. . |
| 4,334,984 | 6/1982 | Vagac et al. . |
| 4,360,402 | 11/1982 | Ortner et al. . |
| 4,405,450 | 9/1983 | Selder . |
| 4,738,750 | 4/1988 | Ackel . |
| 4,983,258 | 1/1991 | Maxham . |
| 5,002,633 | 3/1991 | Maxham . |

OTHER PUBLICATIONS

Article entitled *Converting Paper–Mill Sludge to Papermaking Pulp and Filler Products*, John V. Maxham, *Industrial Wastewater*, Mar./Apr., 1995.

*Primary Examiner*—Matthew O. Savage
*Attorney, Agent, or Firm*—Burns, Doane, Swecker & Mathis

[57] ABSTRACT

A method for recovering fiber useful for papermaking from an effluent stream includes a primary process for treating an effluent stream to separate usable fiber from contrary matter, and secondary operations, supplementing the primary process, to treat the contrary matter rejected by the primary process to recover usable fibers contained in the reject matter. In addition, the secondary processing steps separate the reject material into organic and inorganic fractions, which may be usable in other processes. The method of the invention does not require the addition of water as do conventional processes, simplifies handling, disposal, and reduces the costs of disposal.

27 Claims, 1 Drawing Sheet

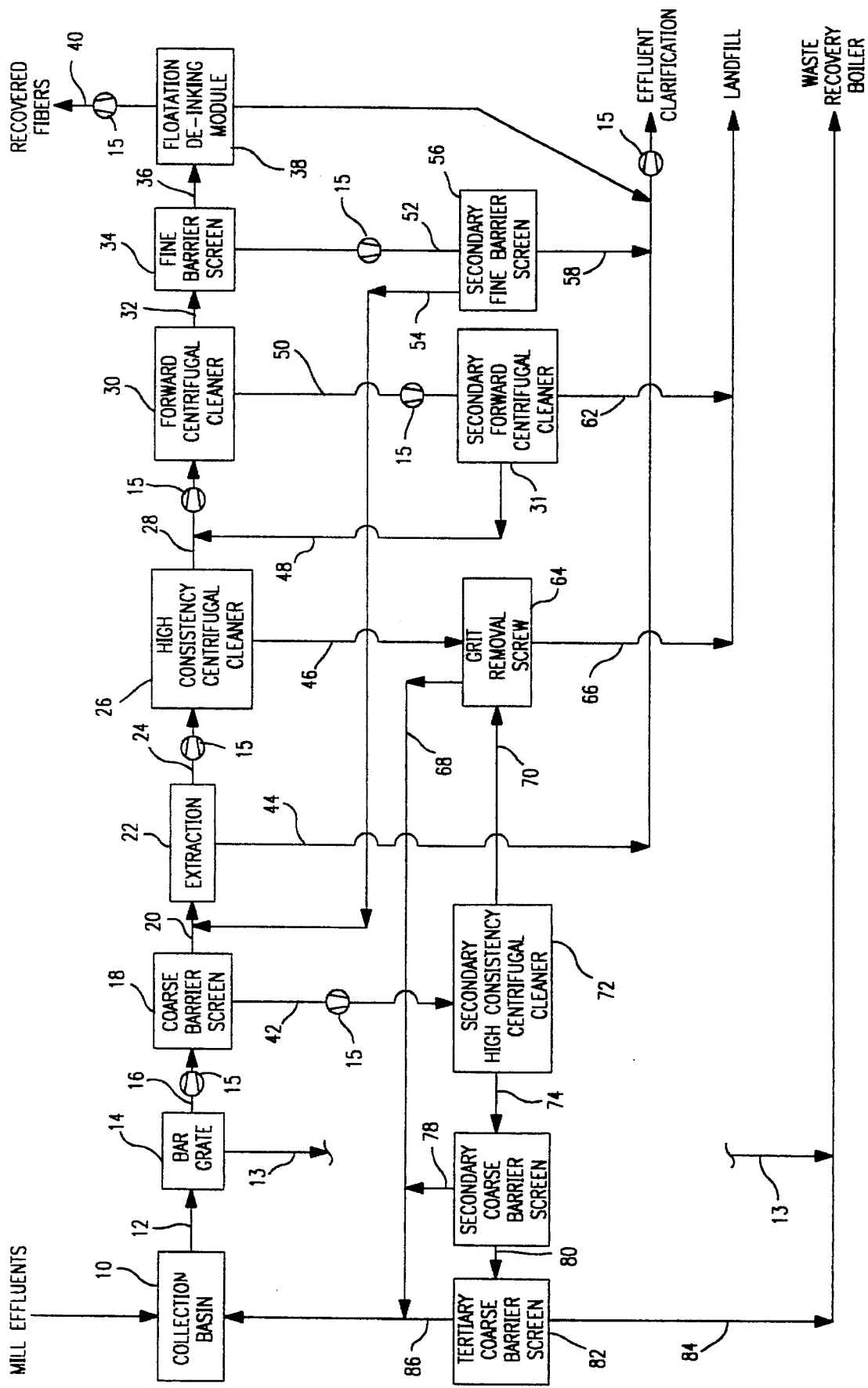

METHOD FOR RECOVERING FIBER FROM EFFLUENT STREAMS

FIELD OF THE INVENTION

The present invention relates to a method and apparatus for recovering fiber useful for paper making from mill effluent streams containing fiber and substantial quantities of contrary materials.

BACKGROUND OF THE INVENTION

In a secondary fiber papermaking mill, paper, such as tissue, is made from secondary fiber furnishes, such as recycled office paper, newspaper, and magazines, obtained in municipal curbside paper collections and business paper waste collection, for example. Papermaking fibers are extracted from the waste paper sources and supplied to a conventional papermaking machine. Since the source of the papermaking fibers is waste paper, other materials not useful for papermaking are also usually present. These contrary materials, and the water in which the source materials are carried, must be processed efficiently and handled and disposed of in an environmentally responsible manner.

The use of secondary fiber furnishes continues to increase in the manufacture of pulp and paper. The economic feasibility of using such secondary furnishes depends on the fraction of useful fiber that can be extracted from the total furnish. The size of this useful fiber fraction, known as the yield, depends in large part on the type of waste paper that makes up the furnish. Secondary furnishes, as mentioned, contain substantial amounts of materials not useful for making paper, called contrary materials, for example, fiber fines, staples, paper clips, inks, clays, and the like. While the theoretical yield of a furnish can be determined with precision, perfect recovery of the theoretical yield has yet to be achieved because of technological deficiencies in the recovery processes in current use, or other difficulties.

Conventional processes, as a result of such deficiencies, reject useful fiber that is then lost to disposal. The actual yield of such conventional processes may be increased by the recovery of this fiber.

SUMMARY OF THE INVENTION

The present invention provides a method and apparatus for recovering useful fiber from effluents which contain substantial quantities of contrary materials. The present invention, generally, provides a method and apparatus that overcomes the deficiencies in the art and recovers fiber useful for paper making from effluent at a higher yield than conventional fiber recovery methods.

More particularly, the present invention provides a primary process, utilizing well defined unit operations, for recovering usable papermaking long fiber from mill effluent. Unlike other methods, the method according to the present invention does not add additional water to the effluent stream for processing, which results in less water usage and less water that must be later cleaned, advantageously saving both resources and expense.

The solid concentrations in effluent streams are typically quite low, usually in the range of 0.1% to 0.5% consistency. Contrary materials in effluent streams consist of a variety of materials, including: suspended solids, such as kaolin clay, cellulose fines, lignins, starches and tannins; large scraps of wood, plastic sheet, and fiber bundles; staples, paper clips, sand and glass shards; coating flakes, stickies and styrofoam and similar materials; fine coating specks; and inks. The process according to the invention includes steps to process contrary material according to size and type that maximizes the recovery of useful fiber. In addition, the separation techniques simplify handling of the contrary materials, which are separated into three categories, suspended solids and ink, coating flakes, and inorganic solids. The method also separates the contrary materials in a manner that recovers water for re-use in the fiber de-inking process.

A primary process for recovering paper making fibers from an effluent stream in accordance with the invention comprises steps for separating useful material from reject material that minimizes loss of useful fiber. The method of the invention includes the steps of:

(a) collecting fiber containing effluent in a collection basin;

(b) directing the effluent from the collection basin through a bar grate to separate solid scrap materials from the fiber containing effluent;

(c) screening the fiber containing material through a coarse barrier screen to remove solid materials from the accept effluent;

(d) extracting long fibers from the fiber containing effluent in a curved wire washer, rotating drum, or disk filters;

(e) cleaning the extracted long fibers in a high consistency centrifugal cleaner to remove solids having a specific gravity greater than long fibers;

(f) dilution and further cleaning the accepted material from the high consistency centrifugal cleaner in a low consistency forward centrifugal cleaner to separate fine solids having a specific gravity greater than long fibers;

(g) screening accept material of the forward centrifugal cleaner through a fine barrier screen; and (h) flotation de-inking of the accept material of the fine barrier screen.

An apparatus according to the present invention performs the steps of the method.

An additional aspect of the invention is the inclusion of secondary processes for the recovery of useful fiber from material reject in the primary process. Secondary process operations that act in parallel with the primary process capture long fibers rejected in the primary process and return the captured long fibers to the primary process for recovery, thereby increasing the net fiber yield of the overall method.

The secondary process operations according to the invention also separate the contrary materials for simplified handling and disposal. The secondary process operations separate the contrary materials into three categories suited for different handling operations, suspended solids and inks, coating flakes, and inorganic solids. Suspended solids may be clarified to yield water for recycling and a solid material suitable for producing granular industrial absorbents and other useful products. Coating flakes may be used as fuel in a waste recovery boiler. The inorganic solids, such as staples, sand and glass shards, are usually disposed of in landfills. The smaller quantity of landfill disposed materials reduces the pressure on the environment and the cost of handling and disposing of solid wastes.

BRIEF DESCRIPTION OF THE DRAWING FIGURES

The present invention can be further understood with reference to the following description in conjunction with the appended drawing. The drawing is a schematic representation of the method and apparatus of the invention.

DETAILED DESCRIPTION OF PREFERRED EMBODIMENTS

In accordance with a preferred embodiment of the invention, the drawing shows a primary process for the recovery of long fibers from an effluent stream, indicated by the steps appearing in the upper row of the figure. The term "long fibers" refers to cellulose fibers that have sufficient length to be retained in the Fourdrinier wires of a paper-making machine. Typically, long fibers have a length greater than 1 mm (0.04 inches). The primary process is supplemented by a secondary process that increases the yield of the primary process, indicated by the steps appearing in the lower row. The primary process is designed to recover about 80% of the long fibers useful for papermaking, while rejecting about 95% of the contrary materials. The secondary process is designed to recover about 80% of the long fibers that are rejected in the primary process. About 90% of the contrary material entering the secondary process are rejected for disposal or sent to effluent clarification with the suspended solids.

Mill effluents usually consist of several streams from the various processes in the de-inking and papermaking process. The various streams are directed into a collection basin 10 or pit by gravity flow. All waste streams of potential fiber recovery sources, particularly floor drains, may be collected, and no source is left open for discharge to an industrial sewer or to an effluent treatment facility producing sludge for disposal. By collecting the streams in a collection basin 10, the effect of fluctuations in flow rate of the various streams is reduced. The collection basin 10 also accommodates surges caused by dumped stock or white water chests. Materials recovered from the secondary recovery processes are also collected in the collection basin 10 for reprocessing in the primary process. It has been found advantageous to provide a collection basin 10 sufficiently large so that effluent has a residence time of 10 to 15 minutes at the observed nominal flow rate.

The primary process takes effluent slurry from the collection basin 10 and separates usable long fibers from the contraries and returns the usable fibers to the papermaking process. Each step of the primary process separates a particular type or size contrary from the slurry, and passes the accept material, that is, the long fiber and unseparated contraries, to a further step. The reject material is further concentrated and classified in the secondary process operations, as described below.

In the primary process, effluent is discharged from the collection basin 10 to a channel 12 and through a bar grate 14 to screen out large segments of contrary materials, for example wood and plastic scraps. According to a preferred embodiment of the invention, the bar grate 14 may consist of a device interposed in the flow channel 12 having 2½ inch deep bars spaced apart 1 or 2 inches to form a coarse vertical barrier. A rake device with tines positioned between the bars pulls the trapped material upward to keep the face of the bar grate 14 clear. This material is discharged through chute 13, and ultimately disposed of in a waste recovery boiler. A device found to be suitable is the Climber Screen by Infilco Degremont.

Effluent that has passed through the bar grate 14 is pumped through a pipe 16 to a coarse barrier screen 18 which removes smaller contraries, such as coating flakes, stickies, styrofoam particles and coarse sand and glass shards. The coarse barrier screen preferably comprises a screen basket having openings in the range of 0.050 to 0.062 inches. The device includes a rotating element that generates pressure pulses to prevent fibers from blinding the screen. A device found to be suitable is the Centriscreen® manufactured originally by the Bird Machine Co.

A stock chest, or basin, and pump 15 may be provided to collect the effluent from the bar grate 14 and pump it to the coarse barrier screen 18. The illustrated embodiment of the invention shows locations where stock chest and pump units 15 may be advantageously installed.

Effluent passing through the coarse barrier screen 18 is pressured through a pipe 20 to the extraction unit 22, which separates suspended solids, such as kaolin clay, cellulose fines, lignins, starches and tannins from the effluent. The extraction unit 22 preferably comprises a curved wire screen formed from a plurality of parallel wedge wires shaped in a 120 degree arc and spaced apart about 0.004 to 0.012 inches (100 to 300 microns) to form a collecting surface for the fibers. The effluent stream is directed tangentially against the top of the screen. Suspended solids carried by water pass through the slots, and are directed through a pipe 44 to effluent clarification. Fiber is retained on the surface formed by the wires. Such a device separates about 85 to 90% of the water and suspended solids from the effluent. The Micrasieve by C-E Bauer has been found to be suitable for use as the extractor. Other devices suitable for use include rotary drum washers and disk filters. The accepted stock consistency is typically between 2% and 4%.

The long fibers collected by the extraction unit 22 are pumped through a pipe 24 to a centrifugal cleaning device 26 to remove relatively high specific gravity contraries, such as staples, sand, grit and glass, from the fiber. In a preferred embodiment of the invention, a high consistency centrifugal cleaner, for example, the Liquid Cyclone from Black Clawson Co., is suitable as the centrifugal cleaning device.

Cleaned fiber from the centrifugal cleaning device 26 is then pressured through a pipe 28 to a low consistency forward centrifugal cleaner 30, to remove small grit and similar material not removed in the high consistency centrifugal cleaner 26. A suitable device for the forward centrifugal cleaner 22 is the RB 90 manufactured by Ahlstrom, having a 3 to 4 inch diameter cone. The Centri-Cleaner® from C-E Bauer has also been found to be suitable.

Preferably, the forward centrifugal cleaner may comprise a bank of cleaners in series. In the illustrated embodiment, reject from the forward centrifugal cleaner 30 is sent through a pipe 50 to a secondary forward centrifugal cleaner 31. The secondary forward centrifugal cleaner 31 is similar to the forward centrifugal cleaner 30, and removes very fine, high density particles, such as glass fragments, from the material. Additional forward centrifugal cleaner stages may be provided to minimize fiber loss by additional reprocessing of the reject material. Accept material is fed from the secondary forward centrifugal cleaner 31 through a pipe 48 to the primary process immediately upstream of the forward centrifugal cleaner 30 for reprocessing. Reject material is discharged through a chute 62 for landfill disposal.

Accept material from the forward centrifugal cleaner 30 is pressured through a pipe 32 through a fine barrier screen 34, which removes very small contrary materials, for example, fine specks and stickies, from the fiber. According to a preferred embodiment, the fine barrier screen 34 includes a screen basket provided with slot shaped openings in the range of 0.004 to 0.006 inches. The long papermaking fibers pass through the screen plate. A rotating element sweeps the screen surface with pressure pulses to prevent fibers from blinding the screen surface. The fine barrier screen 34 is most efficiently operated with an effluent at about 1.3% consistency. A fine barrier screen 34 of the type contemplated here is the LaMort Fiberprep SPM Series pressure screen.

Accept material from the fine barrier screen 34 is pressured through a pipe 36 into a flotation de-inking module 38. The de-inking module 38 removes fine particles of ink and coating materials from the fiber. In the flotation de-inking module 38, an air diffuser inducts and mixes air into the fiber slurry. The fine contrary particles, ranging in size from about 50 to 150 microns, are then removed from the surface of the slurry as a froth. The flotation de-inking module 38 operates most efficiently with an effluent at about 0.7% to 1.3% consistency. The CF Flotation Cell series originally manufactured by Escher Wyss has been found to be a suitable de-inking module.

The de-inking operation completes the primary fiber recovery process. Material recovered from the de-inking module is returned through a pipe 40 to the main fiber preparation process of the plant for use in papermaking. The fiber recovered by the method according to the invention is typically sufficiently clean to be introduced well downstream in the fiber preparation process. Pulping, de-trashing and coarse cleaning operations are not usually necessary.

The secondary process operations recover usable fibers rejected in the primary process and recycle the fibers to the collection basin 10 or the extraction unit 22 for recovery in the primary process. The various components in the secondary process generally may be smaller in size and/or capacity than the corresponding units in the primary process because of the lower flow quantity in the secondary process. Reject material from the secondary process is separated mainly into organic and inorganic fractions, concentrated and discharged for disposal or sent to effluent clarification.

Reject material from the coarse barrier screen 18, which, as mentioned, consists of relatively large contraries, is pumped through a pipe 42 to a secondary high consistency centrifugal cleaner 72, which is preferably a unit similar to the high consistency centrifugal cleaner 26. The secondary high consistency centrifugal cleaner 72 removes grit-like material from the reject material of the coarse barrier screen 18.

Rejected grit is discharged by gravity through chute 70 to a grit removal screw 64, which separates grit solids from water. In addition, grit removed by the high consistency centrifugal cleaner 26 is discharged through a chute 46 to the grit removal screw 64. The grit screw 64 separates grit from water, and the grit is discharged through a chute 66 for disposal, preferably to a landfill. Water from the grit removal screw 64 is returned to the collection basin 10 through a pipe 68 by gravity discharge. The Sand Separator manufactured by Con Silium Bulk-Babcok has been found to be a suitable grit removal screw.

The accept material from the secondary high consistency centrifugal cleaner 72 is pressured through a pipe 74 to a secondary coarse barrier screen, a unit similar to the coarse barrier screen 18 of the primary process. Accept material from the secondary coarse barrier screen is recycled through a pipe 78 to the collection basin 10 for reprocessing in the primary process. Reject material is pressured through a pipe 80 to the tertiary coarse barrier screen 82 for further separation. The tertiary coarse barrier screen 82 preferably comprises a horizontal cylinder having perforations in the range of 0.080 to 0.120 inches in diameter. The concentration of relatively large sized contraries in this reject material requires the larger hole sizes. The screen 82 is kept clean by a rotating element in conjunction with a low pressure water shower. The Reject Sorter originally manufactured by Bird Escher Wyss is a suitable unit for use as the tertiary coarse barrier screen 82. Accept material is returned through a pipe 86 to the collection basin 10 by gravity flow. Reject material from this step, which typically has a consistency of 30% to 50%, is sent for disposal through a chute 84, preferably to an on-site waste recovery boiler.

Reject material from the fine barrier screen 34 is pumped through line 52 to a secondary fine barrier screen 56, which is similar in design and operation to the fine barrier screen 34 in the primary process. Accept materials are pressured through a pipe 54 to the extraction unit 22. Reject material is discharged through a pipe 58 for effluent clarification. Clarified water is suitable for recycling to the fiber preparation area of the mill. The concentrated solids removed by effluent clarification may be further densified, granulated and dried for use as industrial absorbents or agricultural carriers.

The foregoing has described the preferred principles, embodiments and modes of operation of the present invention; however, the invention should not be construed as limited to the particular embodiments discussed. Instead, the above-described embodiments should be regarded as illustrative rather than restrictive, and it should be appreciated that variations, changes and equivalents may be made by others without departing from the scope of the present invention as defined by the following claims.

What is claimed is:

1. A method for recovering useful fibers for papermaking and water from paper mill effluent in a secondary fiber papermaking mill, the effluent containing papermaking fibers and contrary materials, comprising:

(a) collecting mill effluent in a collection basin;

(b) conducting mill effluent from the collection basin in a liquid effluent stream to an extraction unit;

(c) extracting long fibers from the effluent stream in the extraction unit;

(d) conducting long fibers in a useful fiber stream from the extraction unit through a cleaning step and a deinking step to return the papermaking fiber to the mill for making paper;

(e) individually removing combustible components and suspended solids and inks and inorganic solids and water from the effluent stream;

(f) conducting only the combustible components to a waste recovery boiler;

(g) conducting only the suspended solids and inks to a clarifier for further processing;

(h) conducting only said inorganic solids to a disposal site; and (i) returning only said water from the removing step to the collection basin.

2. The method according to claim 1, wherein the combustible components are in a consistency of between 30% and 50% when removed from the effluent.

3. The method according to claim 1, wherein the extracting step includes directing a stream of the effluent tangentially against a curved screen.

4. The method according to claim 1, wherein the cleaning step includes directing the effluent through a high consistency centrifugal cleaner.

5. The method according to claim 4, further comprising the step of further cleaning the useful fiber stream from the high consistency centrifugal cleaner before the de-inking step.

6. The method according to claim 1, wherein the step of removing combustible components includes screening the effluent.

7. The method according to claims 1 further comprising a step of screening the effluent before the extracting step.

8. The method according to claim 1, further comprising the step of directing the effluent from the cleaning step through a fine barrier screen before the de-inking step.

9. A method for recovering papermaking fibers from mill effluent in a secondary fiber deinking papermaking mill, the effluent containing papermaking fibers, wood and plastic scraps, and other contrary materials, comprising the steps of:

(a) collecting mill effluent in a collection basin;

(b) directing the effluent from the collection basin through a bar grate to separate wood and plastic scraps from the mill effluent;

(c) passing the mill effluent from step (b) through a coarse barrier screen;

(d) extracting long fibers from the effluent in an extraction unit;

(e) cleaning the extracted long fibers in a high consistency centrifugal cleaner to remove contrary materials having a specific gravity greater than the long fibers;

(f) further cleaning the accept material including long fibers from the high consistency centrifugal cleaner in a forward centrifugal cleaner and conveying the accept material including long fibers to a fine barrier screen;

(g) screening the accept material from the forward centrifugal cleaner in the fine barrier screen; and (h) removing ink from accept material including long fibers from the fine barrier screen.

10. The method of claim 9, wherein the coarse barrier screen comprises a perforated basket that is capable of separating contrary matter of the type including coating flakes, stickies, styrofoam particles, sand and glass from the fiber.

11. The method of claim 9, wherein the step of extracting long fibers is performed by a washer or filter.

12. The method of claim 9, wherein the step of extracting long fibers separates suspended solids of the type including clay, fiber fines and lignins from the long fibers.

13. The method of claim 9, wherein the step of cleaning the extracted fibers in the high consistency centrifugal cleaner separates coarse solids of the type including staples, sand, grit and glass from the fibers.

14. The method of claim 9, wherein the fine barrier screen comprises a basket having slotted openings that is capable of separating solids of the type including coating particles and stickies.

15. The method of claim 9, wherein the step of removing ink from the accept material of the fine barrier screen is by a flotation de-inking operation.

16. The method of claim 15, wherein the step of flotation de-inking includes inducting and mixing air into long fiber containing material, and removing a froth of ink and fine particles.

17. The method of claim 9, wherein reject effluent from the ink removing step is directed to a clarification unit.

18. The method of claim 9, wherein the step of further cleaning the effluent includes cleaning in at least an additional forward centrifugal cleaner to further concentrate reject material of the forward centrifugal cleaner and returning accept material to the process upstream of the forward centrifugal cleaner.

19. The method of claim 9, further comprising the steps of directing reject material from the high consistency centrifugal cleaner to a grit separator, separating grit from water in the reject material and directing the water to the collection basin.

20. The method of claim 9, further comprising the steps of screening reject material from the fine barrier screen in a secondary fine barrier screen, and returning accepted material to the process upstream of the extracting step.

21. The method of claim 9, further comprising the steps of further cleaning the reject effluent from the coarse barrier screen to obtain recoverable material, and returning the recoverable material to the collection basin.

22. The method of claim 21, wherein the step of further cleaning comprises cleaning the effluent in a secondary high consistency centrifugal cleaner, screening an accept effluent from the secondary high consistency centrifugal cleaner in a secondary coarse barrier screen, directing accept effluent from the secondary coarse barrier screen to the collection basin, and further screening a reject effluent from the secondary coarse barrier screen in a tertiary coarse barrier screen.

23. A method of recovering papermaking fibers from a variety of discharge streams in a secondary fiber papermaking mill, comprising the steps of:

(a) collecting discharge streams containing papermaking fibers and water in a collection basin;

(b) drawing an effluent slurry containing papermaking fibers from the collection basin;

(c) separating papermaking fibers from the effluent slurry by means of an extraction unit and discharging a reject stream containing clay and cellulose;

(d) separating inorganic solid materials from the effluent slurry by means of at least one centrifugal cleaner;

(e) separating combustible materials from the effluent slurry after step b) and prior to steps c) and d);

(f) separating water from the inorganic solids;

(g) separating water from the combustible materials; and (h) returning water separated in steps (f) and (g) to the collection basin.

24. The method of claim 23, wherein the step of separating combustible materials from the effluent slurry includes passing the slurry through a grate, and conducting the combustible materials to a waste recovery boiler.

25. The method of claim 23, wherein the step of separating papermakinq fibers includes directing the effluent slurry against a curved wire screen arranged as a plurality of parallel wires in an arc and collecting fibers on the wire screen.

26. The method of claim 23, including de-inking the separated papermaking fibers by flotation.

27. The method of claim 23, further comprising conducting said effluent slurry through a coarse barrier screen between the collection basin and the extraction unit.

\* \* \* \* \*